United States Patent [19]

Xercavins

[11] 4,258,518
[45] Mar. 31, 1981

[54] POSSIBLY REMOVABLE DEVICE FOR GUIDING THE DEFLECTION OF STRETCHED CABLES

[75] Inventor: M. Pierre Xercavins, Quille, France
[73] Assignee: Freyssinet International, France
[21] Appl. No.: 974,542
[22] Filed: Dec. 29, 1978
[30] Foreign Application Priority Data
Dec. 30, 1977 [FR] France ................... 77 39870
[51] Int. Cl.³ ............................................ E04C 5/12
[52] U.S. Cl. ........................................ 52/223 L; 52/230
[58] Field of Search ............. 52/223 R, 223 L, 230, 52/225, 226; 57/210, 212, 213, 200; 405/259, 260; 174/111

[56] References Cited

U.S. PATENT DOCUMENTS

| | | | |
|---|---|---|---|
| 1,291,406 | 1/1919 | Chaplin | 174/111 |
| 2,761,649 | 9/1956 | Woolcock | 254/29 A |
| 3,351,320 | 11/1967 | Harvey | 254/29 A |
| 3,422,501 | 1/1969 | Yoshimura | 52/230 |
| 3,866,273 | 2/1975 | Brandestini et al. | 52/223 L |
| 3,977,137 | 8/1976 | Patry | 52/60 |

FOREIGN PATENT DOCUMENTS

| | | | |
|---|---|---|---|
| 645314 | 7/1962 | Canada | 405/259 |
| 709150 | 5/1965 | Canada | 52/225 |
| 1520075 | 2/1968 | France | 52/230 |

Primary Examiner—James L. Ridgill, Jr.
Attorney, Agent, or Firm—David M. Ostfeld

[57] ABSTRACT

In the flaring hole of body containing prestressed cables provided for allowing deflection of a cable, the same passes through a stack of rigid circular members avoiding distortion of the cable cross-section when leaning against the flaring wall.

The cable may be provided with an anchoring head abutting against the body allowing dismantling of the cable by removing the fixing means of this body.

12 Claims, 11 Drawing Figures

U.S. Patent    Mar. 31, 1981    Sheet 1 of 4    4,258,518
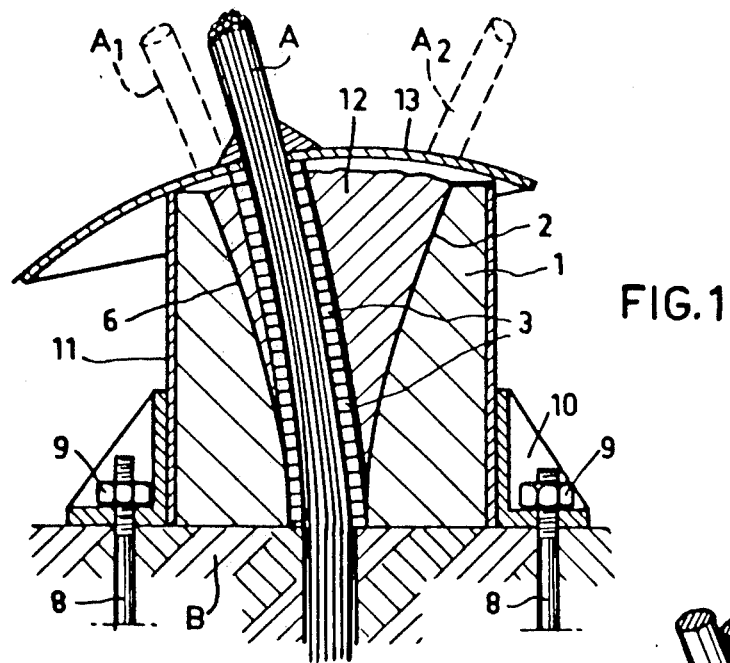
FIG. 1
FIG. 2
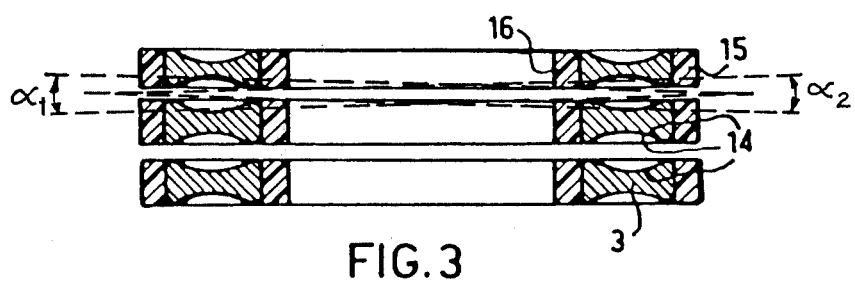
FIG. 3

POSSIBLY REMOVABLE DEVICE FOR GUIDING THE DEFLECTION OF STRETCHED CABLES

FIELD OF THE INVENTION

The present invention relates to a device for guiding the deflection of cables subjected to pulls of variable direction. It further relates to an improvement in the anchoring of such cables enabling them to be replaced.

BACKGROUND OF THE PRIOR ART

Cables, such as stays, cables for mooring floating structures, for cable-ways or cable-bridges, are known to be subjected to considerable pulling forces, with appreciable spatial angular variations, particularly due to the mobility of the structures retained or due to the action of the wind, waves, currents, etc. The cables may be conventional stranded cables or bundles of parallel rectilinear wires or strands enclosed in protective envelopes or sheathes, as in the prestressing art.

Also, to ensure guiding of the deflection of cables where they leave their anchorage, it has already been proposed that the cables pass through an outwardly trumpet flared channel, interposing between the outer surface of the cable and the inner wall of the flare, a solid lubricant avoiding, in manner known per se, a surface alteration of the strands due to the variations in tension of the cable pressed against the guiding surface.

Particularly when it is applied to a cable formed by a bundle of parallel strands, such an embodiment is unsatisfactory, as it does not avoid the deformations of the cross-section of the cable which, due to the mutual actions between strands, produce in the cable undesirable localized stresses entailing a considerable reduction in its fatigue resistance.

BRIEF DESCRIPTION OF THE INVENTION

It is an object of the present invention to provide a device allowing cables of the type discussed in the Background to undergo considerable changes in direction without risk of being crushed or being subject to bending stresses exceeding their fatigue resistance. Moreover, produced so as to be removable and associated with a cable anchoring head, the present invention gives the possibility of changing the cable if, for example, said cable has undergone alterations for any reason, and of placing the new anchorage at the same spot, after having recovered all or part of the old anchorage.

According to the invention, the strands of the portion of cable engaged in the flared channel pass through the openings of a stock of circular rigid members capable of a slight variation in angular position with respect to one another.

Thus, such a stack presents a certain longitudinal flexibility which enables it to be adapted to the curvature of the wall of the trumpet flared channel and to carry over to this wall the transverse forces due to the curvature of the cable, whilst the stack of the rigid members maintains the strands of the cable in relative mutual position and retains the geometry of the cross-section of this cable.

In a first embodiment of the invention, the rigid members are substantially flat rings between which are interposed flexible, distortable rings, the whole forming around the cable a sort of transversely rigid jacket. This embodiment has the advantage of being suitable for cables of all types, whatever their construction.

In another embodiment, the rigid members are preferably lenticular discs, abutting against one another and having the parallel strands of the cable passing therethrough through a plurality of corresponding openings.

Whether the site is on land or in water, the stack surrounding the cable, as well as the wall of the flare channel, are advantageously each coated with a solid layer with lubricating properties, for example "teflon" (Registered trade-mark) and the flared channel is filled with a mass of plastic material allowing the displacements of the cable but preventing foreign bodies from penetrating into this channel. The flared channel may be made in the anchoring mass itself; it may also be made in a body connected to this mass.

In an advantageous embodiment of the invention, the cable is provided with a head which abuts against said flared body on the side opposite the flare and this body is fixed to the mass by dismountable means whose tensile strength is at least equal to the pull exerted on the cable during use.

To facilitate fixing and to reduce the volume of this flared body, it may comprise a recess receiving at least the anchoring head.

In this way, the disengagement of the dismountable body releases the cable with its head and the guiding means, this allowing the whole to be easily replaced.

BRIEF DESCRIPTION OF THE DRAWINGS

The invention will be more readily understood on reading the following description with reference to the accompanying drawings, in which:

FIG. 1 is an axial section through a first embodiment of a guide body;

FIG. 2 is an enlarged detailed view of FIG. 1;

FIG. 3 is an enlarged axial section through a variant embodiment;

DESCRIPTION OF THE PREFERRED EMBODIMENT

I. Brief Description

Figures 4, 5, 6, 7:
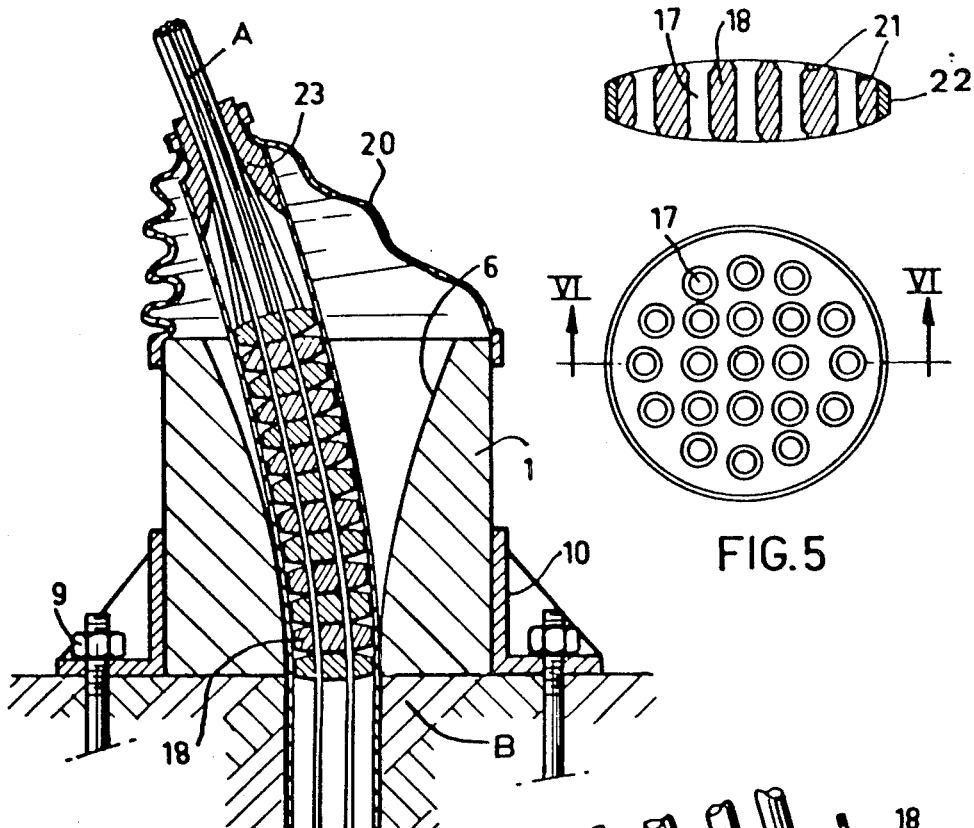
FIG. 4 shows a second embodiment of a guide body, in axial section.
FIG. 5 is a plan view of a disc of the stock illustrated in FIG. 4.
FIG. 6 is a section along VI—VI of FIG. 5.
FIG. 7 is an enlarged section, similar to FIG. 4, of a variant embodiment.

In the flaring hole (6) of body (1) provided for allowing deflection of cable A, the same passes through a stack of rigid circular members (3) avoiding distortion of the cable cross-section when leaning against the flaring wall (6).

The cable may be provided of an anchoring head abutting against the body (1) allowing dismantling of the cable by removing the fixing means of this body.

II. Detailed Description

Referring now to the drawings, the cable A leaving natural or artificial mass B, perpendicularly thereto, passes through a body 1 comprising an outwardly trumpet flared channel 2, of flattened section or of revolution, according to the degree of freedom which the cable A must have outside the mass B.

In its part inside the channel 2, the cable A passes without clearance through a succession of flat, rigid rings 3, for example made of steel, separated by elastic rings 4 (FIG. 2) made of rubber or plastic elastomer, the whole forming a flexible jacket around cable A.

A supple outer coating 5 made of synthetic matter ensures an elastic abutment against the flared wall of the body 1 itself coated with a similar solid layer 6 preferably having anti-friction properties, like coating 5. To limit the displacements of the strands of the cable A in the jacket, the free spaces between strands and inner wall of the jacket may be filled with a plastic material 7 which may be replaced by a grease.

The materials constituting the rings 4, the coatings 5 and 6 and the filler 7 are chosen in thickness and quality to take into account the value of the reactions due to the curvature of the wall of the flared channel and to the pulling force exerted on cable A which, in the embodiment illustrated, may thus move between positions $A_1$ and $A_2$.

Thus when leaning against the trumpet flared channel wall, two consecutive disc members or rings 3 stand at a definite angle $\alpha$ (FIG. 2) of their opposite faces, angle which is also substantially the angle between two perpendicular to the curvature of the trumpet flared channel at a distance corresponding to the sum of the thicknesses of both rings 3 and 4. Obviously angle $\alpha$ is the more the little as rings 3 and 4 are thinner and curvature radius of the flaring wall is large.

The volume 12 allowing the movement of the cable A may be filled with a substance such as grease or a bituminous product whose viscosity is chosen as a function of the possible speed of variation in the orientation of the pull acting on the cable A to follow this variation without rupture.

A complementary protection of the volume 12 against penetration by foreign bodies may be ensured either by means of a supple sleeve (cf. 20, FIG. 4), or by means of a rigid cover, such as 13, fast with the portion of cable leaving the volume 12 and which is sufficiently large in order to constantly cover the flared opening of the channel 2.

As shown in FIG. 3, to increase the volume of the intermediate plastic rings 4 (which allows the angular displacement of the opposite faces rigid rings 3) without substantially increasing the spacing of these rigid rings, said rings may be provided on their faces with concave-bottomed grooves 14, the rings 4 then being molded to the corresponding shape.

Finally, the coatings 5 and 7 may be replaced by annular coatings 15 and 16 respectively on the edges of the rigid rings 3, the plastic rings 4 (not shown in FIG. 3) being of thickness substantially equal to that of the coated rigid rings. Thus the angular position between opposite faces of two consecutive rings 3 may vary between the extreme values $\alpha_1$ on one side and $\alpha_2$ on the other side at the opening of the trumpet flared channel when variation in direction of the pull acting on the cable (i.e. deflection of the cable) is maximum.

In the embodiment shown in FIGS. 4 to 7, the strands a of the cable A leave the mass B in parallel and separate from one another. Each of the strands is threaded in the channel formed by the succession of the corresponding openings 17 of stacked discs 18. These discs may be in the form of bi-convex lenses, as shown in FIGS. 4 to 6 or, as shown in FIG. 7, they may be flat and separated by discs 19 made of elastomer.

The curvature of the bi-convex discs may be chosen to be just sufficient to allow the desired bending of the cable in the flared channel; it may also be greater if necessary for prior cable assembling phases.

The discs 18 may be made of steel. They also may be made of synthetic material reinforced with fibers or filaments such as steel, glass, carbon. To increase their strength, they may receive a binding hoop 22. In manner known per se, the inlets of the holes 17 of the discs may be flared or rounded, as shown at 21, to avoid injuring the strands if the material of the discs entails such a risk. As before, a sheath 24 encloses the stack of discs and distributes the pressure between the discs and the flared wall.

Moreover, these discs act as strand or wire spacers when the deflection of the cable is close to its anchorage, for retaining the wires in the parallel arrangement imposed thereon by this anchorage. Beyond this zone, a transition should be arranged to give the cable the advantageous compactness for the standard part thereof. A deflection ring 23 (FIG. 4) enables this transition to be ensured and, possibly, by abutting on the stock of the discs, holds said latter in place, if the cable is not upwardly directed and if thus the discs 18 are not maintained in place by gravity. As before, a sheath 24 may cooperate with the coating 6 of the flared channel for the transmission of the lateral forces of the cable to the wall of said channel.

When a cable deflection is useful at a distance from the anchorage, a device of the type shown in FIGS. 1 to 3 will preferably be used, which retains the compactness of the cable.

The trumpet flared channel 2 may be made directly in the mass B. The body 1 may also, especially if the mass B constitutes the anchoring mass, be distinct and made of metal of concrete. In particular, it will advantageously be constituted, as indicated in FIG. 1, by a block of concrete hooped by its peripheral reinforcement 11, which may support the members 10 for fixing to the mass B. The trumpet flared body 1 is then for example fixed to the mass B by threaded rods 8 sealed in this mass and nuts 9 which cooperate either with fastening lugs 10 or with a peripheral ring of the same section fixed to the outer metal wall 11 of the body 1.

As shown in FIGS. 8 to 11 trumpet, the flared body may also serve as abutment for a cable anchoring head and this body alone is fixed by its periphery to the mass by dismountable means.

Thus, the release of these means allows the cable to be dismantled by removal of the head and the flared body which, at least, may be recovered to be used with the new cable.

Figure 8:
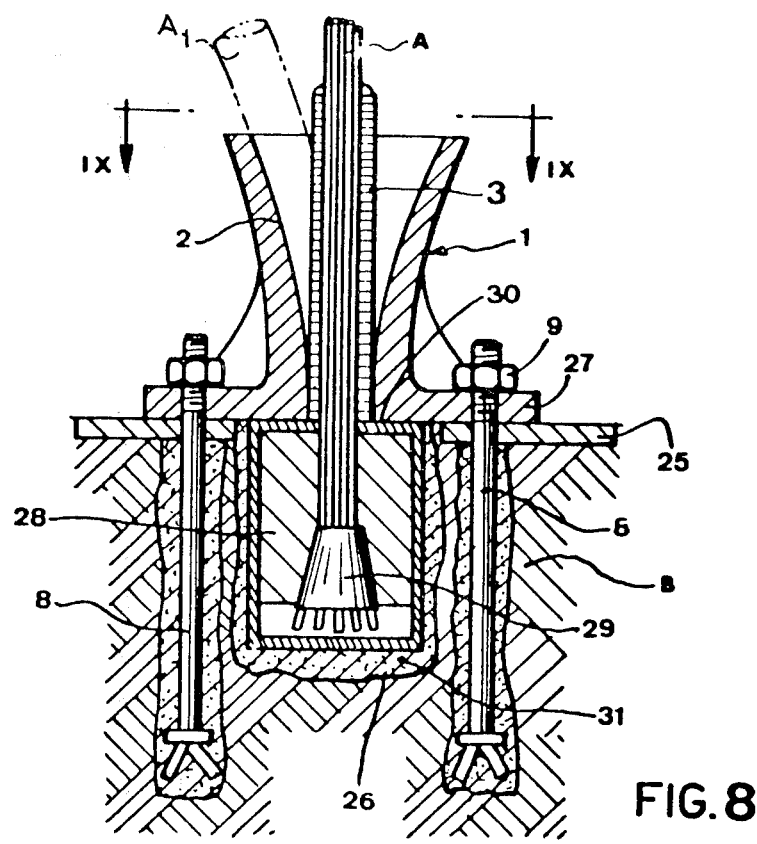
FIGS. 8 and 10 show two examples of dismountable anchorage in axial section, FIGS. 9 and 11 being views along IX—IX and XI—XI respectively of FIGS. 8 and 10.
Figure 9:
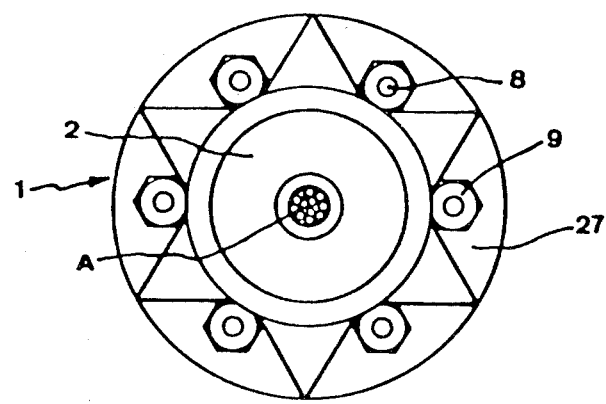

In FIGS. 8 and 9, the rods 8 terminating in threads adapted to receive nuts 9 are sealed in the mass B, which in the present case is assumed to be rock. The correct position of the rods is ensured by a plate 25 forming gauge, and which, left in place, ensures a flat support surface for the mass B. This plate is hollowed at its center opposite the excavation 26 made in the mass.

The cable A passes through the body 1 comprising the flared trumpet channel 2 and the flange 27 pierced with holds for passage of the rods 8.

The end of the cable is provided with an anchoring head 28 of any type, for example, as illustrated, formed by a cylinder, made of metal or concrete, through which the cable passes and comprising a truncated cavity in which an anchoring cone 29 may be forced.

The anchoring head comprises, on the side opposite the cone 29, a support surface 30, flat in the present case, which is applied against the surface of the body 1 facing the mass.

Thus the positioning of the nuts 9 and tightening thereof maintain the hollowed body 1 in place and ensure the anchorage of the cable A, i.e., its resistance to the ascending pulling forces.

If the cable is constantly stretched, the cavity 26 may remain free. In the contrary case, the bottom of this cavity may be filled with sand 31 to steady the head 28.

If the mass B is artificial and made of concrete, it is clear that the positioning of the rods 8 and their anchoring in the mass are considerably simplified. The cavity 26 and the seal of the rods are in this case obtained when this mass is constructed.

Figure 10:
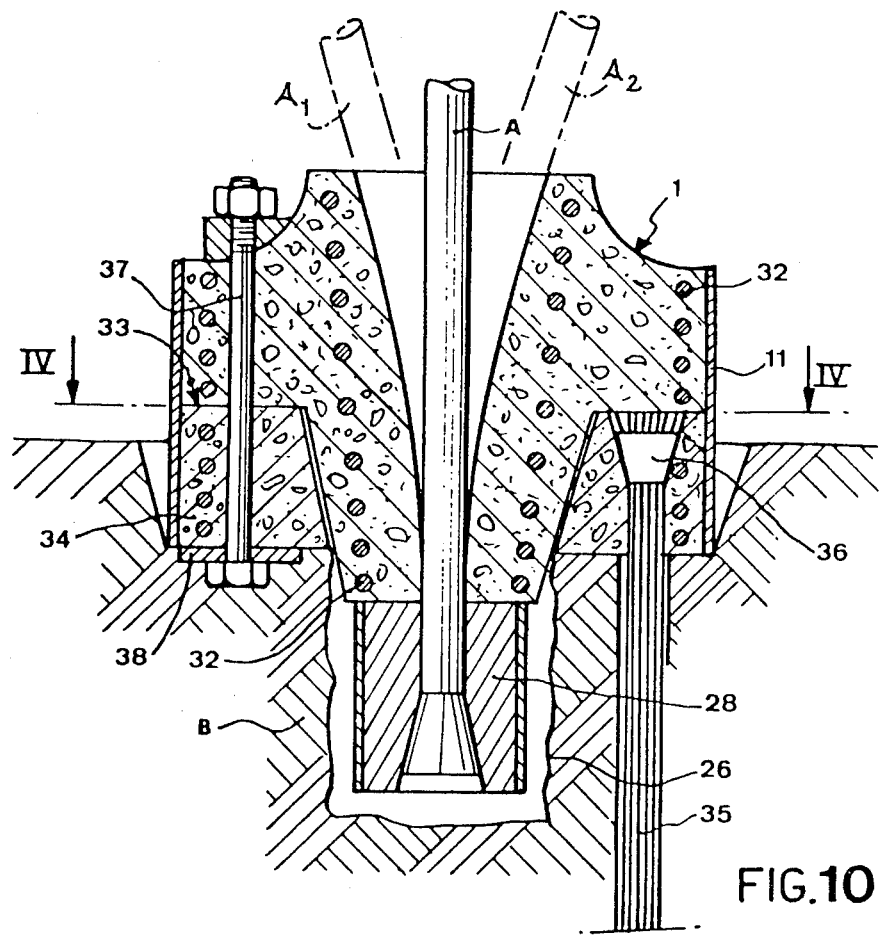
Figure 11:
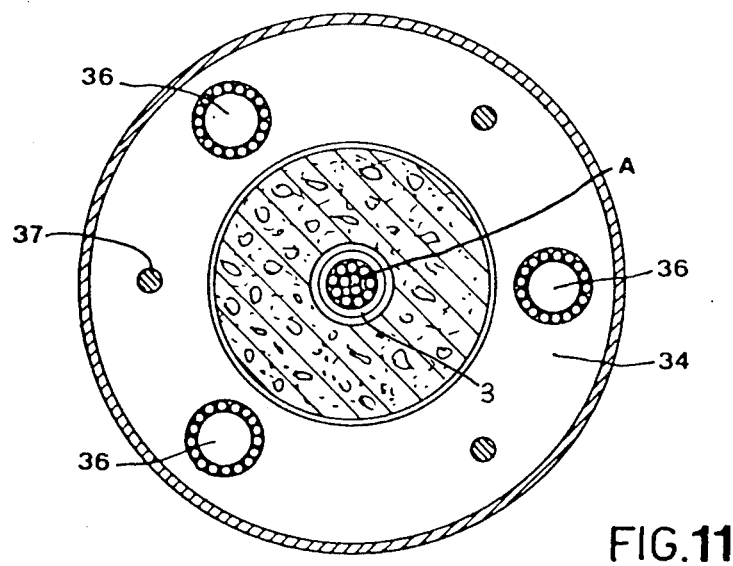

In the embodiment of FIGS. 10 and 11, the body 1 is made of concrete hooped by its outer metal envelope 11 and suitably distributed steel wire turns 32.

The body 1 rests by its shoulder 33 on a concrete ring 34, likewise hooped, which is fixed to the mass B by the stretched cables 35 of which the strands are anchored in its upper face, by cones 36. Bolts 37 of which the heads abut by plates 38 against the lower face of this ring fix the body 1 against the ring 16.

As before, construction is simplified (by elimination of the rings 34 and cables 35) when the mass B is made of concrete and directly arranged to receive the device according to the invention.

The fixing of the flared body to the mass may also be ensured by threaded members, sets of wedges or keys, by a fitted assembly of bayonet type. In addition, this flared body may possibly be composed of several parts, maintained by a binding in order to release the cable to be replaced more easily and be easily positioned around the new cable.

Because many varying and different embodiments may be made within the scope of the inventive concept herein taught and because many modifications may be made in the embodiment herein detailed in accordance with the descriptive requirements of the law, it should be understood that the details herein are to be interpreted as illustrative and not in a limiting sense.

What is claimed as invention is:

1. Deflection guiding arrangement in a solid mass for a flexible cable made of a plurality of strands and issuing from said mass substantially perpendicularly thereto through a trumpet flared cavity in axial relationship therewith, said cable being submitted to a pull of variable direction on either sides of the axis of said cavity, said arrangement comprising a stack of substantially similar rigid circular members axially threaded by said cable, said members being adapted for angular relative displacement of each pair of their adjacent faces and for tangential contact of their peripheries with the wall of said cavity whereby deflection of the cable, being guided by the said wall, the cross-sections of the cable in the said cavity are kept by said stack.

2. Deflection guiding device for a flexible cable made of a plurality of strands, anchored in a solid mass in substantially perpendicular relationship thereto and submitted to a pull of variable direction on either sides of said perpendicular, said device comprising a solid body having an outwardly trumpet flaring cavity coaxial with said perpendicular through which passes said cable; means for securing said body to said mass; a stack of substantially similar rigid, circular substantially flat members having a height larger than the depth of said cavity engaged therein and threaded without appreciable clearance on said cable, consecutive members of said stack being adapted for angular variation of position between their opposite faces whereby progressive deflection of the cable from said perpendicular, under variation of the pull direction, entails progressive contact of the peripheries of said members with the wall of said cavity without cross-sectional distortion of said cable in the deflected portion.

3. Device according to claim 2 further comprising a sheath of supple material wrapping said stack and a coating of anti-friction material of said cavity cooperating with said sheath for even repartition of lateral pressure on the cable.

4. Device according to claim 2 further comprising viscous material filling the cavity and means for preventing entry of external elements into said cavity.

5. Device according to claim 2 further comprising plastic layers of elastomeric material between said consecutive members for adaptation to angular variations of position of said consecutive members.

6. Device according to claim 2 wherein opposite faces of said members comprise peripheral round bottomed grooves.

7. Device according to claim 2 wherein the circular members are rings the central opening of which is threaded on the whole cable.

8. Device according to claim 2 wherein the circular members are discs pierced with a plurality of openings aligned in the stack through each of which passes a cable strand.

9. Device according to claim 8 wherein the pierced discs comprise convex faces in mutual contact for adaptation to said angular variations of position.

10. Device according to claim 2 wherein said means for securing said body to said mass are dismountable and of a resistance to tractive force greater than the pull exerted on the cable during use, and further comprising a head fast with the cable end directed towards said mass, said head being adapted to rest against the body side opposed to said cavity.

11. Device according to claim 10 wherein said mass is provided with a recess, centrally located with respect to said dismountable securing means, for housing said head, said body resting on said mass about said recess.

12. Device according to claim 11 further comprising solid grains filling the space between said head and the bottom of said recess.

* * * * *

UNITED STATES PATENT AND TRADEMARK OFFICE
CERTIFICATE OF CORRECTION

PATENT NO. : 4,258,518
DATED : March 31, 1981
INVENTOR(S) : M. Pierre Xercavins

It is certified that error appears in the above—identified patent and that said Letters Patent is hereby corrected as shown below:

In the Abstract, line 7, change "againt" to - - against - -.

Column 2, line 6, change "flare" to - - flared - -.

Column 4, line 34, change "of" to - - or - -.

Column 4, line 43, change "8 to 11 trumpet, the" to - - 8 to 11, the trumpet - -.

Column 4, line 59, change "the flared trumpet" to - - the trumpet flared - -.

Signed and Sealed this

Eighteenth Day of August 1981

[SEAL]

*Attest:*

*Attesting Officer*

GERALD J. MOSSINGHOFF

*Commissioner of Patents and Trademarks*